United States Patent
Kumar et al.

(10) Patent No.: US 11,999,375 B2
(45) Date of Patent: Jun. 4, 2024

(54) METHOD AND SYSTEM FOR MANEUVERING VEHICLES USING ADJUSTABLE ULTRASOUND SENSORS

(71) Applicant: Wipro Limited, Bangalore (IN)

(72) Inventors: Balaji Sunil Kumar, Bangalore (IN); Manas Sarkar, Barasat (IN)

(73) Assignee: Wipro Limited, Bangalore (IN)

( * ) Notice: Subject to any disclaimer, the term of this patent is extended or adjusted under 35 U.S.C. 154(b) by 59 days.

(21) Appl. No.: 17/241,135

(22) Filed: Apr. 27, 2021

(65) Prior Publication Data

US 2022/0281475 A1 Sep. 8, 2022

(30) Foreign Application Priority Data

Mar. 3, 2021 (IN) .............................. 202141008926

(51) Int. Cl.
*B60W 60/00* (2020.01)
(52) U.S. Cl.
CPC ....... *B60W 60/001* (2020.02); *B60W 2420/54* (2013.01); *B60W 2554/4048* (2020.02); *B60W 2554/4049* (2020.02)
(58) Field of Classification Search
CPC ....... B60W 60/001; B60W 2554/4048; B60W 2554/4049; B60W 2420/54
See application file for complete search history.

(56) References Cited

U.S. PATENT DOCUMENTS

| | | | |
|---|---|---|---|
| 11,733,699 B2* | 8/2023 | Johnson | G01S 7/003 701/21 |
| 2010/0080419 A1* | 4/2010 | Okugi | G06T 7/20 382/104 |
| 2014/0168377 A1* | 6/2014 | Cluff | G06T 7/85 348/47 |
| 2018/0039273 A1* | 2/2018 | Delp | B60R 11/00 |
| 2018/0297506 A1 | 10/2018 | Stefan et al. | |
| 2020/0081120 A1 | 3/2020 | Soldner et al. | |
| 2020/0114509 A1* | 4/2020 | Lee | G01S 17/89 |

(Continued)

FOREIGN PATENT DOCUMENTS

DE 102013200793 A1 7/2014
EP 1674885 A1 6/2006

*Primary Examiner* — Dale W Hilgendorf
*Assistant Examiner* — Hana Lee
(74) *Attorney, Agent, or Firm* — Finnegan, Henderson, Farabow, Garrett & Dunner, LLP

(57) ABSTRACT

A method and a system for maneuvering vehicles using adjustable ultrasound sensors is disclosed. The method includes determining at least one first position of an object relative to a vehicle using at least one high range sensor and determining for each of at least one first position of the object non-conformance with one or more object position criteria. The method further includes determining at least one second position of object relative to vehicle, when at least one first position of the object is in non-conformance with one or more object position criteria. The method further includes assigning at least one ultrasound sensor to dynamically focus on the object and maneuvering the vehicle on a trajectory plan based on the at least object attribute. Each of plurality of ultrasound sensors is deployed on rotatable mount and assigned at least one ultrasound sensor is dynamically focused by rotating on associated rotatable mount.

18 Claims, 12 Drawing Sheets

(56) References Cited

U.S. PATENT DOCUMENTS

| | | | |
|---|---|---|---|
| 2020/0128700 A1* | 4/2020 | Lee | H05K 7/20963 |
| 2020/0209391 A1* | 7/2020 | Hu | G01S 17/42 |
| 2020/0233418 A1* | 7/2020 | Liu | G05D 1/0231 |
| 2020/0356091 A1* | 11/2020 | Nagarajan | G05D 1/0088 |
| 2021/0027629 A1* | 1/2021 | Tao | G06V 10/273 |
| 2022/0185267 A1* | 6/2022 | Beller | B60W 60/0015 |

* cited by examiner

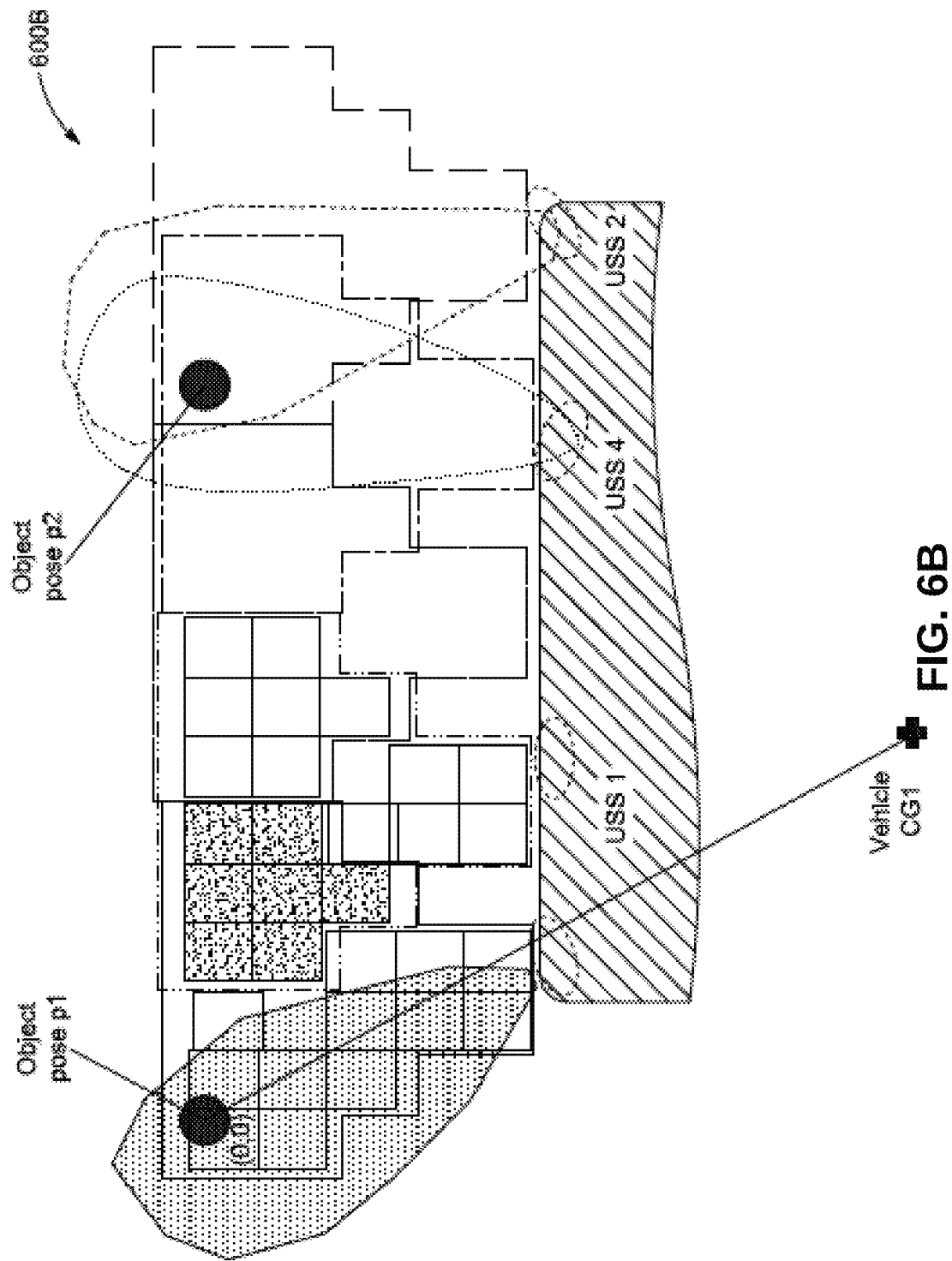

METHOD AND SYSTEM FOR MANEUVERING VEHICLES USING ADJUSTABLE ULTRASOUND SENSORS

TECHNICAL FIELD

This disclosure relates generally to autonomous vehicles, and more particularly relates to a method and system for maneuvering autonomous vehicles using adjustable ultrasound sensors.

BACKGROUND

Generally, autonomous vehicle may use various sensors for environment observation. Such sensors may include ultrasound sensors that are primarily used for determining close object proximity. The ultrasound sensors are short range sensors that may be placed on a front and/or rear bumper of a vehicle. Since the ultrasound sensors may be fitted on a lower portion (bumpers) of the vehicle, such ultrasound sensors can cover objects in a blind spot that gets missed by high range sensors. Typically, the ultrasound sensors are accurate in a direction of focus. Consequently, various ultrasound sensors may be required to cover a wide degree (say, 90 to 120 degree) of front or rear area of the vehicle. Further, ultrasound sensors may detect low intensity for the object in front of the vehicle when the object falls out of line-of-sight of the ultrasound sensors and associated vehicle navigation system may assume that the object has disappeared.

Accordingly, there is a need for a method and a system to dynamically focus on objects for maneuvering vehicles.

SUMMARY

In an embodiment, a method for maneuvering vehicles using adjustable ultrasound sensors is disclosed. In one embodiment, the method may include determining at least one first position of an object relative to a vehicle using at least one high range sensor. The method may further include determining for each of the at least one first position of the object non-conformance with one or more object position criteria. Each of the one or more object position criteria may correspond to at least one of: position of the object relative to the vehicle and visibility of the object to the at least one high range sensor. The method may further include determining at least one second position of the object relative to the vehicle, when the at least one first position of the object is in non-conformance with the one or more object position criteria. The method may further include assigning in response to the determination of at least one second position, at least one ultrasound sensor from a plurality of ultrasound sensors to dynamically focus on the object to determine at least one object attribute associated with the object. Each of the plurality of ultrasound sensors may be deployed on a rotatable mount. The assigned at least one ultrasound sensor may be dynamically focused by rotating on the associated rotatable mount. The method may further include maneuvering the vehicle on a trajectory plan based on the at least object attribute.

In another embodiment, a system for maneuvering vehicles using adjustable ultrasound sensors is disclosed. The system includes a processor and a memory communicatively coupled to the processor. The memory stores processor instructions, which, on execution, causes the processor to determine at least one first position of an object relative to a vehicle using at least one high range sensor. The processor instructions further cause the processor to determine for each of the at least one first position of the object non-conformance with one or more object position criteria. Each of the one or more object position criteria may correspond to at least one of: position of the object relative to the vehicle and visibility of the object to the at least one high range sensor. The processor instructions further cause the processor to determine at least one second position of the object relative to the vehicle, when the at least one first position of the object is in non-conformance with the one or more object position criteria. The processor instructions further cause the processor to assign in response to the determination of at least one second position, at least one ultrasound sensor from a plurality of ultrasound sensors to dynamically focus on the object to determine at least one object attribute associated with the object. Each of the plurality of ultrasound sensors may be deployed on a rotatable mount. The assigned at least one ultrasound sensor may be dynamically focused by rotating on the associated rotatable mount. The processor instructions further cause the processor to maneuver the vehicle on a trajectory plan based on the at least object attribute.

In yet another embodiment, a non-transitory computer-readable storage medium for maneuvering vehicles using adjustable ultrasound sensors is disclosed. The non-transitory computer-readable storage medium has instructions stored thereon, a set of computer-executable instructions causing a computer comprising one or more processors to perform steps comprising determining at least one first position of an object relative to a vehicle using at least one high range sensor. The operations may further include determining for each of the at least one first position of the object non-conformance with one or more object position criteria. Each of the one or more object position criteria may correspond to at least one of: position of the object relative to the vehicle and visibility of the object to the at least one high range sensor. The operations may further include determining at least one second position of the object relative to the vehicle, when the at least one first position of the object is in non-conformance with the one or more object position criteria. The operations may further include assigning in response to the determination of at least one second position, at least one ultrasound sensor from a plurality of ultrasound sensors to dynamically focus on the object to determine at least one object attribute associated with the object. Each of the plurality of ultrasound sensors may be deployed on a rotatable mount. The assigned at least one ultrasound sensor may be dynamically focused by rotating on the associated rotatable mount. The operations may further include maneuvering the vehicle on a trajectory plan based on the at least object attribute.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 6A-6C illustrate schematic diagrams for assigning at least one ultrasound sensor from a plurality of ultrasound sensors in an area divided into grids, in accordance with an embodiment.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

The following described implementations may be found in the disclosed system and method for maneuvering a vehicle using adjustable ultrasound sensors. The disclosed system may assign ultrasound sensor(s) to dynamically focus on an object located in a blind spot region (or blind spot). The blind spot may correspond to an area that obscures vision of a vehicle. In accordance with an embodiment, the assigned ultrasound sensor(s) may be deployed on a rotatable mount to increase a Field of View (FOV) of the assigned ultrasound sensor(s). Exemplary aspects of the disclosure may be used for closer object detection, when the vehicle moves in a constrained space. In an embodiment, the vehicle guiding system may be configured to assist in providing navigational suggestions to a user of the vehicle or the vehicle itself to avoid mishaps. Therefore, embodiments of the disclosed system may result in solving a problem deeply rooted in navigation technology, autonomous vehicles, and vehicular safety.

Figure 1:
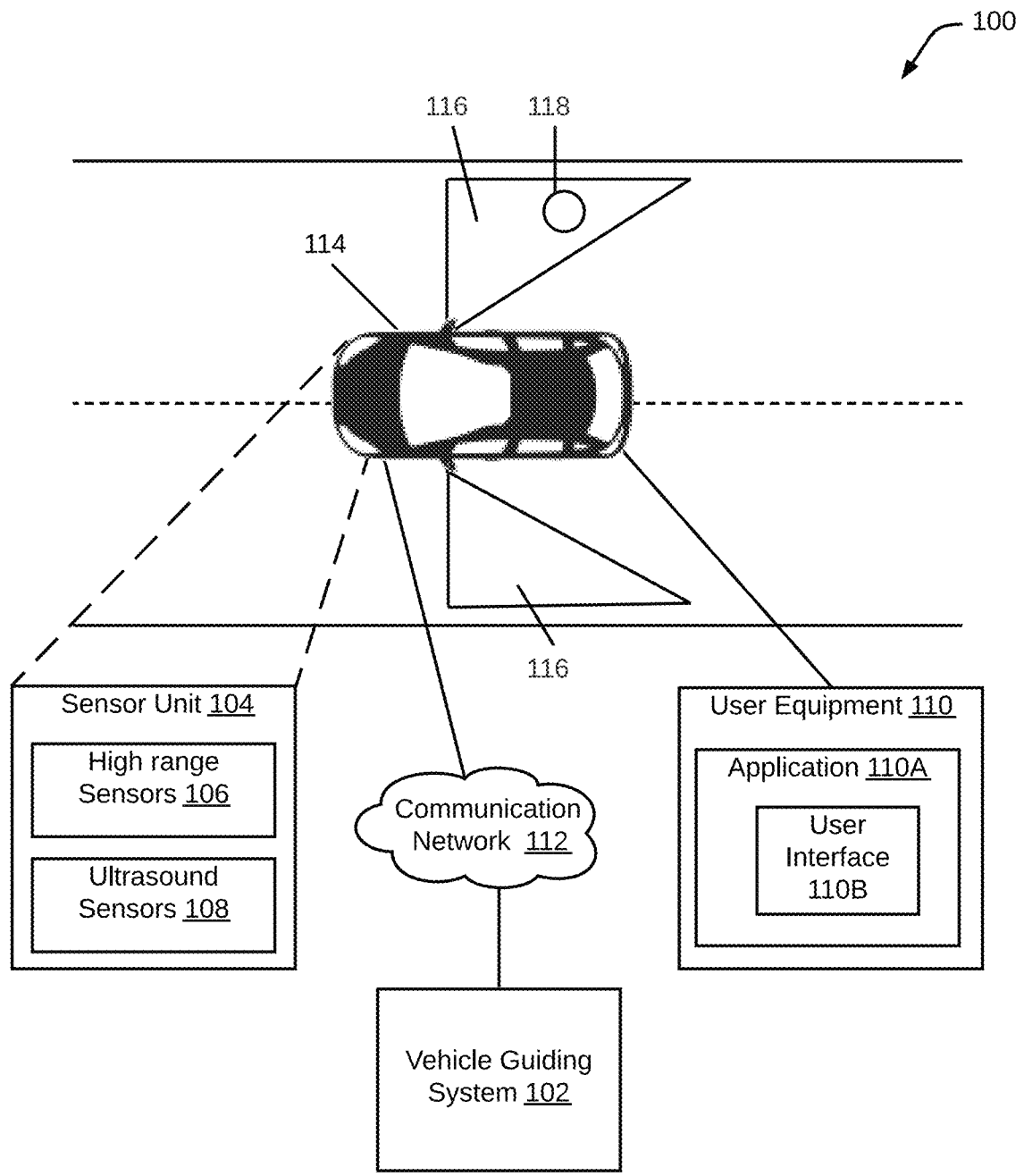
FIG. 1 is a block diagram that illustrates an environment for a vehicle guiding system to maneuver vehicles using adjustable ultrasound sensors, in accordance with an embodiment.

With reference to FIG. 1, a block diagram that illustrates an environment 100 for a vehicle guiding system 102 to maneuver vehicles using adjustable ultrasound sensors is depicted, in accordance with an embodiment. The environment 100 includes the vehicle guiding system 102, a sensor unit 104 that includes high range sensors 106 and ultrasound sensors 108, User Equipment (UE) 110, an application 110A, a User-Interface (UI) 110B, and a communication network 112. Further, there is shown a vehicle 114, a blind spot region 116 for the vehicle 114, and an object 118. The sensor unit 104 and the UE 110 are associated with the vehicle 114.

The vehicle guiding system 102 may be communicatively coupled to the sensor unit 104 and the UE 110, via the communication network 112. The sensor unit 104 may directly communicate with the UE 110 associated with the vehicle 114. In an alternative embodiment, the sensor unit 104 may be communicatively coupled to the UE 110 of the vehicle 114, via the communication network 112.

The vehicle guiding system 102 may include suitable logic, circuitry, interfaces, and/or code that may be configured to determine a first position of the object 118 relative to the vehicle 114 using one or more of high range sensors 106. The vehicle guiding system 102 may be configured to determine a second position of the object 118 relative to the vehicle 114 using one or more of ultrasound sensors 108. In accordance with an embodiment, the object 118 may correspond to a static object, such as, but not limited to, a pole, a guard rail, a lamp post, a signal pole, and a fixed wall. The vehicle guiding system 102 may be configured to assign at least one ultrasound sensor from the ultrasound sensors 108 to dynamically focus on the object 118 to determine at least one object attribute associated with the object 118. The vehicle guiding system 102 may be configured to maneuver the vehicle 114 on a trajectory plan based on the at least object attribute.

The vehicle guiding system 102 may be configured to organize and/or configure data from the sensor unit 104 for performing navigation-related functions and/or services, such as route guidance and map display. The navigation-related functions may correspond to vehicle navigation, pedestrian navigation, navigation to a favored parking spot, or other types of navigation. While example embodiments described herein generally relate to vehicular travel and parking along roads, example embodiments may be implemented for boat travel along maritime navigational routes including dock or boat slip availability.

By way of example, the vehicle guiding system 102 may be implemented as a plurality of distributed cloud-based resources by use of several technologies that are well known to those skilled in the art. In accordance with an embodiment, the vehicle guiding system 102 may include one or more dedicated computers. Other examples of implementation of the vehicle guiding system 102 may include, but are not limited to, a web/cloud server, an application server, a media server, and a Consumer Electronic (CE) device.

Although in FIG. 1, the vehicle guiding system 102 and the UE 110 are shown as two separate entities, this disclosure is not so limited. Accordingly, in some embodiments, the entire functionality of the UE 110 may be included in the vehicle guiding system 102, without a deviation from scope of the disclosure. In some other example embodiments, the vehicle guiding system 102 may be implemented in the vehicle 114.

The sensor unit 104 may include suitable logic, circuitry, interfaces, and/or code that may be configured to determine a position of an object (such as, the object 118) relative to a vehicle (such as, the vehicle 114) using high range sensors 106 or ultrasound sensors 108. The sensor unit 104 may include various types of sensors. For example, the sensor unit 104 may include an image capture device (such as, a camera) to capture the object 118. In accordance with an embodiment, the sensor unit 104 may be positioned on or within the vehicle 114. Examples of the high range sensors 106 in the sensor unit 104 may include, but are not limited to, stereoscopic depth cameras and a Light Detection and Ranging (LIDAR) sensor.

The UE 110 may comprise suitable logic, circuitry, interfaces, and code that may be configured to provide navigation assistance to the vehicles, such as, the vehicle 114 among other services. In accordance with an embodiment, the UE 110 may be configured to provide navigation functions (such as, guidance for maneuvering the vehicle on a trajectory plan) associated with the vehicle 114. The UE 110 may be a part of the vehicle 114. The UE 110 may be installed in the vehicle 114. In accordance with an embodiment, the UE 110 may be the vehicle itself.

The UE 110 may include the application 110A with the user interface 110B. In accordance with an embodiment, the UE 110 may be an in-vehicle navigation system, such as, an infotainment system, a personal navigation device (PND), a portable navigation device, a cellular telephone, a smart phone, a personal digital assistant (PDA), a watch, a camera, a computer, a workstation, and other device that may perform navigation-related functions (such as digital routing and map display). Examples of the UE 110 may include, but are not limited to, a mobile computing device (such as a laptop computer, tablet computer, mobile phone and smart phone), navigation unit, personal data assistant, watch, and camera. Additionally, or alternatively, the UE 110 may be a fixed computing device, such as a personal computer, computer workstation, and kiosk.

The communication network 112 may include a communication medium through which the vehicle guiding system 102 and the UE 110 may communicate with each other. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the environment 100 may be configured to connect to the communication network 112, in accordance with various wired and wireless communication protocols. Examples of such wired and wireless communication protocols may include, but are not limited to, a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The vehicle guiding system 102 may function in an environment with at least one vehicle (such as, the vehicle 114). In one example, the vehicle 114 may be an autonomous vehicle or a manually driven vehicle. An autonomous vehicle may refer to a vehicle which has autonomous driving capabilities at least in some conditions. For example, the autonomous vehicle may exhibit autonomous driving on streets and roads having physical dividers between driving lanes. Although one vehicle 114 is depicted in FIG. 1, it may be contemplated that the vehicle guiding system 102 may operate with multiple vehicles in tandem.

All the components in the environment 100 may be coupled directly or indirectly to the communication network 112. The components described in the environment 100 may be further broken down into more than one component and/or combined together in any suitable arrangement. Further, one or more components may be rearranged, changed, added, and/or removed.

Figure 2:
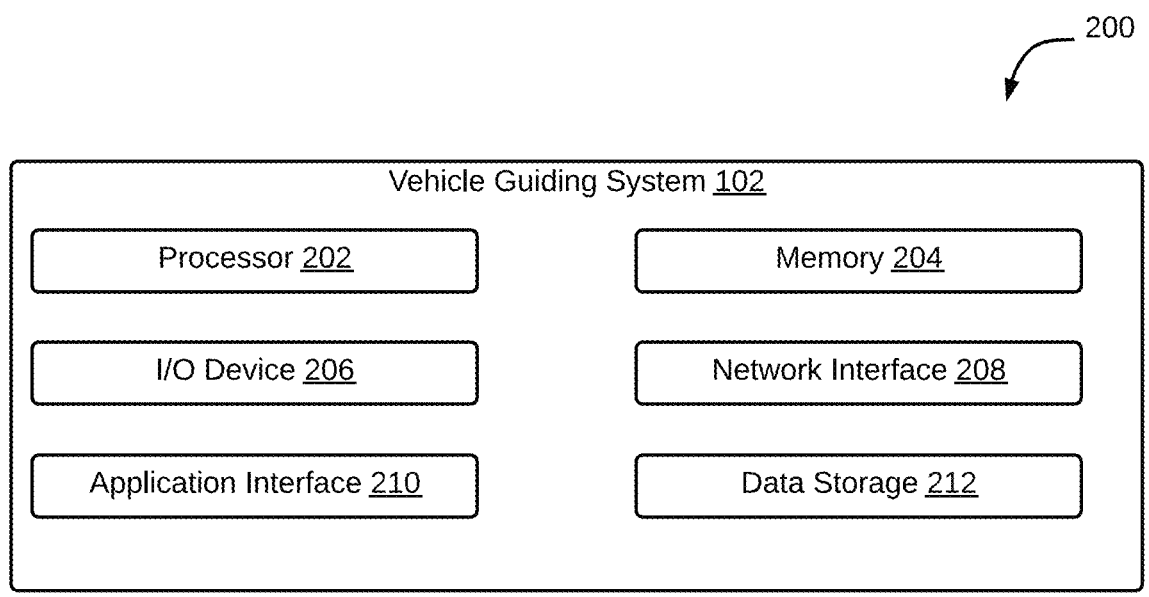
FIG. 2 is a functional block diagram that illustrates an exemplary vehicle guiding system, in accordance with an embodiment.

FIG. 2 is a functional block diagram 200 that illustrates an exemplary vehicle guiding system, in accordance with an embodiment. FIG. 2 is explained in conjunction with elements from FIG. 1. With reference to FIG. 2, there is shown a functional block diagram 200 of the vehicle guiding system 102. The vehicle guiding system 102 may include a processor 202, a memory 204, an input/output (I/O) device 206, a network interface 208, an application interface 210, and a data storage 212.

The processor 202 may be communicatively coupled to the memory 204, the I/O device 206, the network interface 208, the application interface 210, and the data storage 212. Elements and features of the vehicle guiding system 102 may be operatively associated with one another, coupled to one another, or otherwise configured to cooperate with one another as needed to support the desired functionality, as described herein. For ease of illustration and clarity, the various physical, electrical, and logical couplings and interconnections for the elements and the features are not depicted in FIG. 2. Moreover, it should be appreciated that embodiments of the vehicle guiding system 102 will include other elements, modules, and features that cooperate to support the desired functionality. For simplicity, FIG. 2 only depicts certain elements that relate to the techniques described in more detail below.

The processor 202 may include suitable logic, circuitry, interfaces, and/or code that may be configured to maneuver vehicles using adjustable ultrasound sensors. The processor 202 may be implemented based on a number of processor technologies, which may be known to one ordinarily skilled in the art. Examples of implementations of the processor 202 may be a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, Artificial Intelligence (AI) accelerator chips, a co-processor, a central processing unit (CPU), and/or a combination thereof. The processor 202 may be communicatively coupled to, and communicates with, the memory 204.

The memory 204 may include suitable logic, circuitry, and/or interfaces that may be configured to store instructions executable by the processor 202. The memory 204 may store sensor data from the sensor unit 104. Additionally, the memory 204 may be configured to store program code of software application that may incorporate the program code. The memory 204 may be configured to store any received data or generated data associated with storing, maintaining, and executing the vehicle guiding system 102. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and/or interfaces that may be configured to act as an I/O interface between a user (such as, a user associated with the vehicle 114 or the vehicle 114 itself) and the vehicle guiding system 102. The I/O device 206 may include various input and output devices, which may be configured to communicate with different operational components of the vehicle guiding system 102. The I/O device 206 may be configured to communicate data between the vehicle guiding system 102 and the application 110A of the UE 110 associated with the vehicle 114. In accordance with an embodiment, the I/O device 206 may be configured to output the vehicular trajectory plan data to a user device such as the UE 110 of FIG. 1.

In some embodiments, the vehicle guiding system 102 may be configured to provide an environment for development of parking strategy recommendation solutions for navigation systems in accordance with the embodiments disclosed herein. The environment may be accessed using the I/O interface 206 of the vehicle guiding system 102 disclosed herein.

The network interface 208 may include suitable logic, circuitry, interfaces, and/or code that may be configured to facilitate different components of the vehicle guiding system 102 to communicate with other devices, such as the UE 110, in the environment 100, via the communication network 112. In one embodiment, the network interface 208 may be configured to communicate with the sensor unit 104 of the vehicle 114 disclosed in the detailed description of FIG. 1. In some example embodiments, the network interface 208 may be configured to receive destination information of a vehicle, such as the vehicle 114, via the communication network 112.

The network interface 208 may be configured to implement known technologies to support wired or wireless communication. Components of the network interface 208 may include, but are not limited to an antenna, a radio frequency (RF) transceiver, one or more amplifiers, a tuner, one or more oscillators, a digital signal processor, a coder-decoder (CODEC) chipset, an identity module, and/or a local buffer.

The network interface 208 may be configured to communicate via offline and online wireless communication with networks, such as the Internet, an Intranet, and/or a wireless network, such as a cellular telephone network, a wireless local area network (WLAN), a personal area network, and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), code division multiple access (CDMA), LTE, time division multiple access (TDMA), Bluetooth, Wireless Fidelity (Wi-Fi) (such as IEEE 802.11, IEEE 802.11b, IEEE 802.11g, IEEE 802.11n, and/or any other IEEE 802.11 protocol), voice over Internet Protocol (VoIP), Wi-MAX, Internet-of-Things (IoT) technology, Machine-Type-Communication (MTC) technology, a protocol for email, instant messaging, and/or Short Message Service (SMS).

The application interface 210 may be configured as a medium for a user (such as, a user associated with the vehicle 114 or the application 110A of the vehicle 114) to interact with the vehicle guiding system 102. The application interface 210 may be configured to have a dynamic interface that may change in accordance with preferences set by the user and configuration of the vehicle guiding system 102. In some embodiments, the application interface 210 may correspond to a user interface of one or more applications installed on the vehicle guiding system 102.

The data storage 212 may include suitable logic, circuitry, and/or interfaces that may be configured to store program instructions executable by the processor 202, operating systems, various modules, and/or application-specific information, such as sensor data and navigation related data. The data storage 212 may include a computer-readable storage media for carrying or having computer-executable instructions or data structures stored thereon. Such computer-readable storage media may include any available media that may be accessed by a general-purpose or special-purpose computer, such as the processor 202.

By way of example, and not limitation, the data storage 212 may use computer-readable storage media that includes tangible or non-transitory computer-readable storage media including, but not limited to, Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media.

Computer-executable instructions may include, for example, instructions and data configured to cause the processor 202 to perform a certain operation or a set of operations associated with the vehicle guiding system 102. The functions or operations executed by the vehicle guiding system 102, as described in FIG. 1, may be performed by the processor 202. In accordance with an embodiment, additionally, or alternatively, the operations of the processor 202 are performed by various modules that are described in detail, for example, in FIG. 3.

Figure 3:
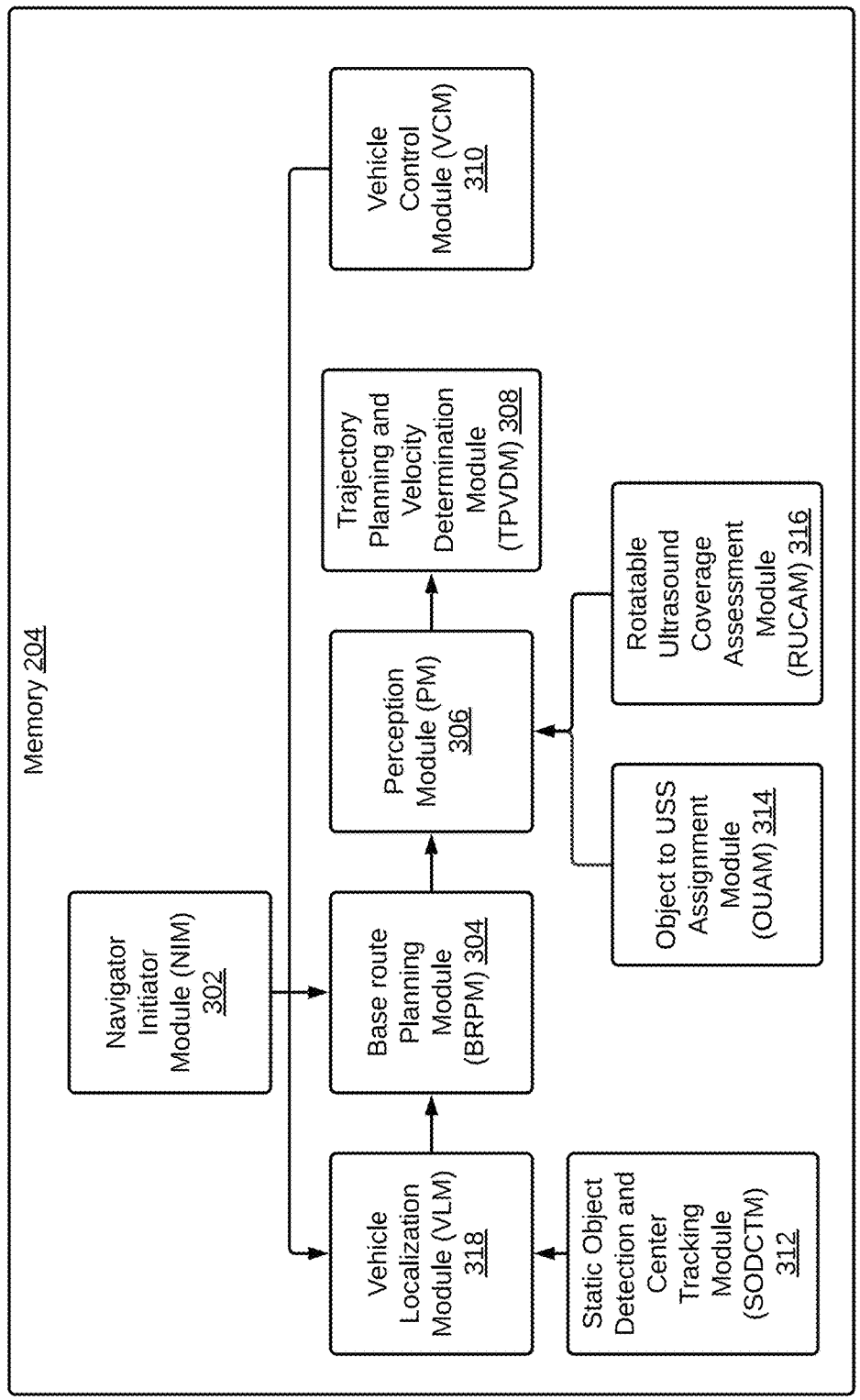
FIG. 3 is a functional block diagram that illustrates various modules within a memory of a vehicle guiding system for maneuvering vehicles using adjustable ultrasound sensors, in accordance with an embodiment.

FIG. 3 is a functional block diagram 300 that illustrates various modules within the memory 204 of the vehicle guiding system 102 for maneuvering vehicles using adjustable ultrasound sensors, in accordance with an embodiment of the disclosure. FIG. 3 is explained in conjunction with elements from FIG. 1 and FIG. 2.

With reference to FIG. 3, there is shown a Navigation Initiator Module (NIM) 302, a Base Route Planning Module (BRPM) 304, a Perception Module (PM) 306, a Trajectory Planning and Velocity Determination Module (TPVDM) 308, a Vehicle Control Module (VCM) 310, a Static Object Detection and Center Tracking (SODCTM) 312, an Object to USS Assignment module (OUAM) 314, and a Rotatable Ultrasound coverage assessment module (RUCAM) 316. In accordance with an embodiment, the OUAM and RUCAM 316 may be used collectively by the vehicle guiding system 102.

The NIM 302 may be configured to initiate navigation process (such as, path planning, velocity generation, and autonomous drive) from a source location to a destination location for the vehicle 114. The NIM 302 may correspond to a UI layer to the vehicle guiding system 102. In accordance with an alternate embodiment, the I/O device 206 may be used to initiate the navigation process from the source location to the destination location for the vehicle 114. In accordance with an embodiment, a user may enter the destination location using the NIM 302 of the vehicle guiding system 102. In accordance with an embodiment, a user may enter the destination location, via the UI 110B of the application 110A installed in the UE 110 and the vehicle guiding system 102 may receive the destination location using the network interface 208, via the communication network 112.

The BRPM 304 may be configured to generate a base path for navigation related function for the vehicle 114 from a current vehicle position to the destination location. In accordance with an embodiment, the base path may be generated using algorithms, such as, but not limited to, Dijkstra A* or any other path planning algorithm on a 2D occupancy grid map.

The PM 306 may be configured to analyze sensor data from the sensor unit 104. The PM 306 may be configured to prepare a comprehensive data about an environment for motion planning and localization of the vehicle 114.

The SODCTM 312 may be configured to use sensor data from the sensor unit 104, (such as, the high range sensors 106) to identify a potential object, such as, the object 118 which may be in a close proximity to the vehicle 114. The object 118 may be identified with a specified center. The SODCTM 312 may be configured to track the object 118 for a relative pose with respect to a vehicle pose as the vehicle 114 moves. The SODCTM 312 may be configured to track the object 118 continuously using the high range sensors 106 to cover large distance. When the object 118 falls inside the blind spot region 116 of the vehicle 114, a low distance range sensor, such as, the ultrasound sensor(s) 108 may be assigned to further determine the position of the object 118. The SODCTM 312 may be configured to use sensor data from the ultrasound sensor(s) 108.

The RUCAM 316 may be configured to assess a coverage region of the ultrasound sensors 108. In accordance with an embodiment, the ultrasound sensors 108 may be fixed on a rotatable mount to add rotational capabilities up to some degree on ultrasound sensor on its z-axis, so that overall coverage of FOV may get increased. In accordance with an embodiment, the rotatable mount may be controlled by a software application associated with the vehicle guiding system 102. Such rotatable mount may facilitate more coverage region in different directions by the ultrasound sensors 108 as compared to the ultrasound sensors 108 without the rotatable mount. Therefore, the RUCAM 316 may facilitate dynamic coverage of the object 118 using a rotatable fixture arrangement of the ultrasound sensors 108.

The OUAM 314 may be configured to assign available ultrasound sensors from the ultrasound sensors 108 to obtain distance data associated with objects, such as, the object 118. Such assigned ultrasound sensors may be oriented to dynamically focus on the object 118 to determine at least one object attribute associated with the object 118. Examples of an object attribute for the object 118 may include, but are not limited to, shape, size, dimension, or position. Based on tracked pose of the object 118, specific ultrasound sensor may be rotated at required degree, to measure the proximity of the object 118 more precisely.

The arrangement of shifting of the ultrasound sensors 108 may happen continuously as the vehicle 114 moves on, the position of the object 118 changes with respect to a vehicle center and the position of the object 118 changes with respect to each ultrasound sensor from the ultrasound sensors 108. With this more precise and robust proximity information is received about the object 118, which the vehicle 114 needs to consider for its maneuvering operation.

The TPVDM 308 may be configured to generate different possible maneuvering trajectory routes for current position of the vehicle 114 up to a certain distance along a global path. The VCM 310 may be configured to provide controller command to vehicle motion and breaking actuator system of the vehicle 114.

The VLM 318 may be configured to provide current position of the vehicle 114 on a map. In accordance with an embodiment, the VLM 318 may use a camera-based location identification by observing unique landmarks and fetching previous observation data record from a known position.

Figure 4:
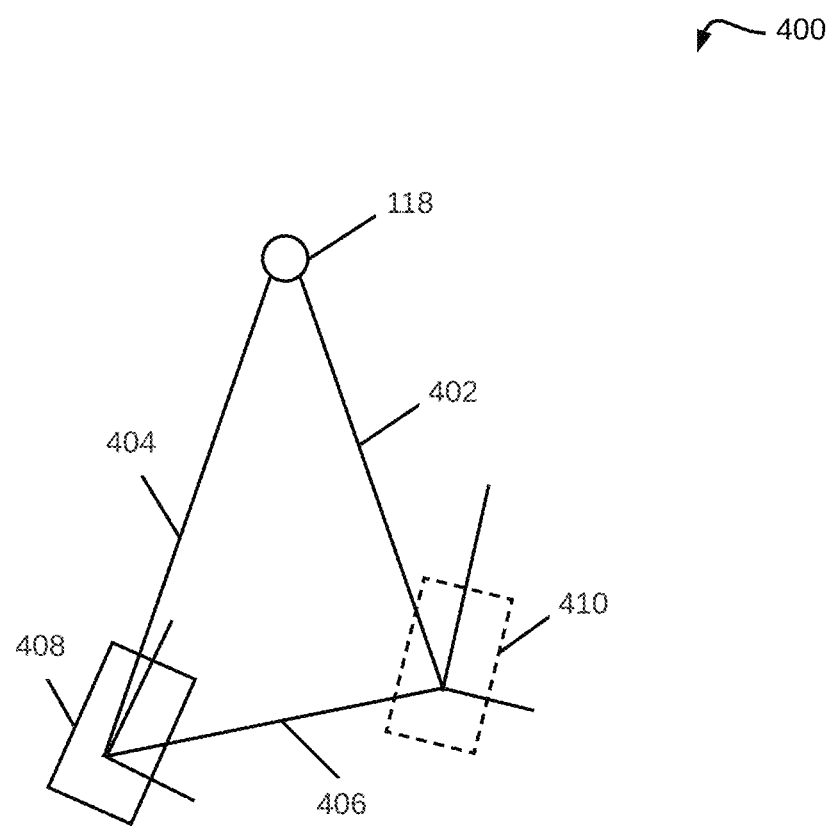
FIG. 4 is a diagram that illustrates determining of at least one position of an object relative to a vehicle using a vehicle guiding system, in accordance with an embodiment.

FIG. 4 is a diagram 400 that illustrates determining of at least one position of the object 118 relative to the vehicle 114 using the vehicle guiding system 102, in accordance with an embodiment. FIG. 4 is explained in conjunction with elements from FIG. 1 to FIG. 3. With reference to FIG. 4, there is shown the object 118, a third transformation relation 402, a first transformation relation 404, a second transformation relation 406, a vehicle center pose 408 (S) and a new vehicle center pose 410 (N).

The SODCTM 312 may be configured to determine potential static objects, (such as, the object 118 described in description of FIG. 1) that the vehicle 114 encounters with close proximity and then continuously track relative position of the object 118 with respect to the vehicle 114. For example, when the vehicle 114 approaches a parking spot, the SODCTM 312 may determine potential static objects (such as, a fixed wall) in close proximity to the vehicle 114.

The SODCTM 312 may be configured to determine at least one first position of the object 118 relative to the vehicle 114 using at least one high range sensor from the high range sensors 106. In an exemplary embodiment, a high range sensor 106 may be a LIDAR. In an exemplary embodiment, the SODCTM 312 may be configured to detect the object 118 from a long distance and pose of the object is determined with respect to the vehicle 114. When the object 118 is first detected by the SODCTM 312, the vehicle center pose 408 may be noted as S (x,y, theta).

The SODCTM 312 may be configured to determine transformation relation of the object 118 with respect to the vehicle 114 which is shown by the line 404. In accordance with an embodiment, the line 404 may be indicative of a first transformation relation as a last known position of the object 118 relative to an initial position of the vehicle 114. The first transformation relation of the object 118 with respect to the vehicle 114 may be represented as Tvdob.

Further, when the vehicle 114 moves and reaches a new position with the vehicle center pose 410 (N), a second transformation relation (represented by line 406) may be determined between remembered vehicle center pose 408 (S) when the object 118 was first detected, and when the vehicle changed to the new center pose, i.e., the vehicle center pose 410 (N). Due to localization of the vehicle 114 at any moment on the map, vehicle position may be known at any instance of time. Therefore, the SODCTM 312 may be configured to determine the second transformation relation 406 for the subsequent position, i.e., the vehicle center pose 410, of the vehicle 114 relative to the initial position, i.e., the vehicle center pose 408 of the vehicle 114. The second transformation relation of the object 118 with respect to the vehicle 114 may be represented as Tvnvd.

Thus, a calculation of transform between two poses (i.e., 408 and 410) may be possible. Further, the SODCTM 312 may be configured to determine a third transformation relation (represented with line 402) for the resultant position of the object 118 relative to the subsequent position, i.e., the vehicle center pose 410 of the vehicle 114, based on the first transformation relation 404 and the second transformation relation 406. A non-conformance with one or more object position criteria may be determined for the subsequent position of the vehicle 114. Therefore, vehicle current pose to object relation (also referred as the third transformation relation 402) may be determined by equation (1) at any instance of time as:

$$Tvnob = Tvdob - Tvnvd \quad (1)$$

In accordance with an embodiment, the SODCTM 312 may be configured to determine a fourth transformation relation (not labelled in FIG. 4) of the object 118 relative to each of the ultrasound sensors 108 at the subsequent position of the vehicle 114. In accordance with an embodiment, the RUCAM 316 may be configured to assign at least one ultrasound sensor from the ultrasound sensors 108 based on the determined fourth transformation relation of the object 118. The fourth transformation relation may correspond to a static relation as the ultrasound sensors 108 are at a fixed pose relation with respect to a vehicle frame associated with the vehicle 114.

Figure 5A:
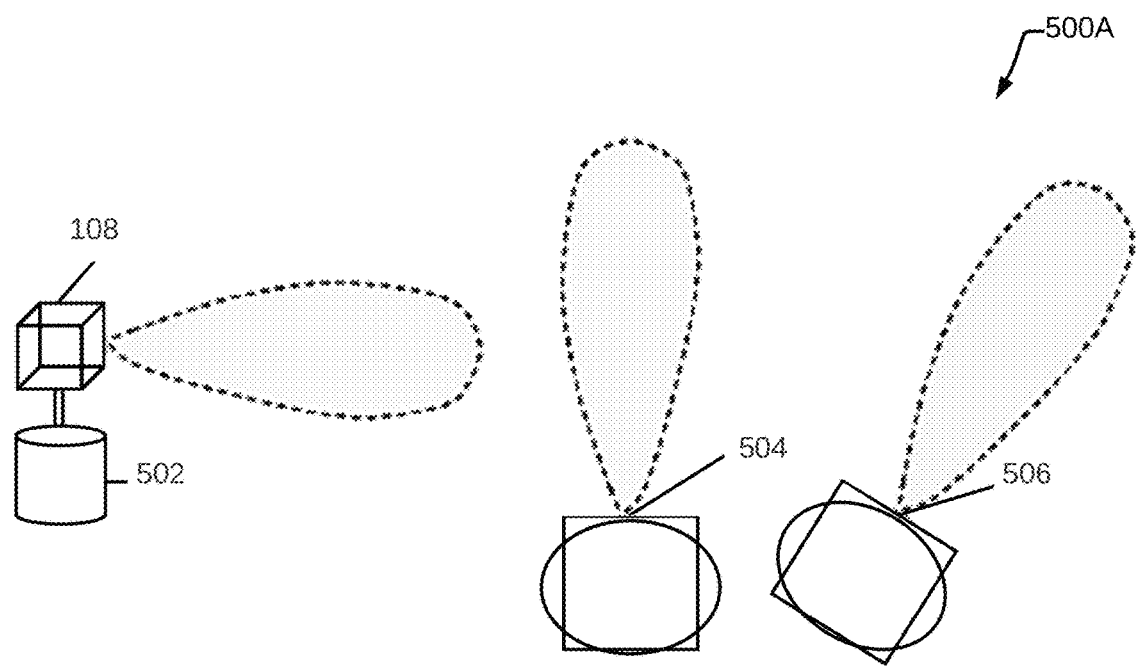
FIGS. 5A-5C collectively illustrate dynamic coverage of ultrasound sensors with use of rotatable fixture arrangement, in accordance with an embodiment.
Figure 5B:
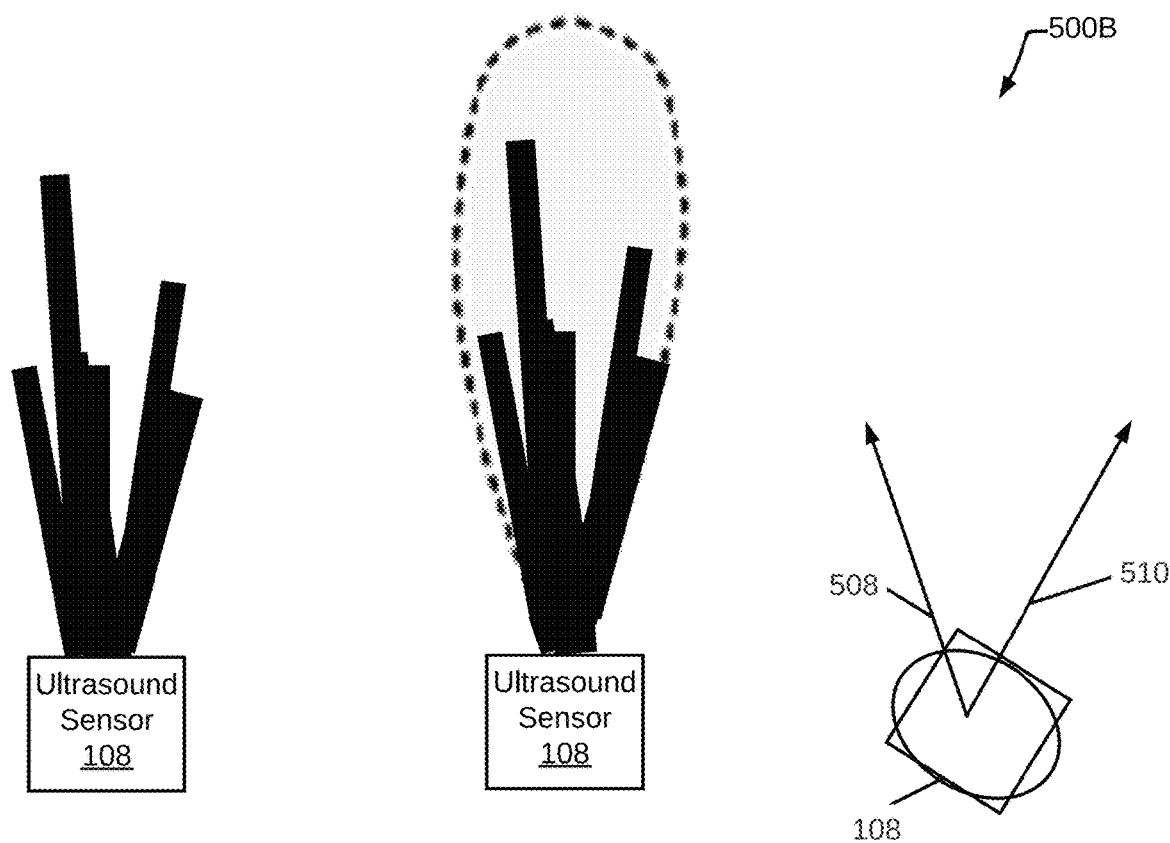
Figure 5C:
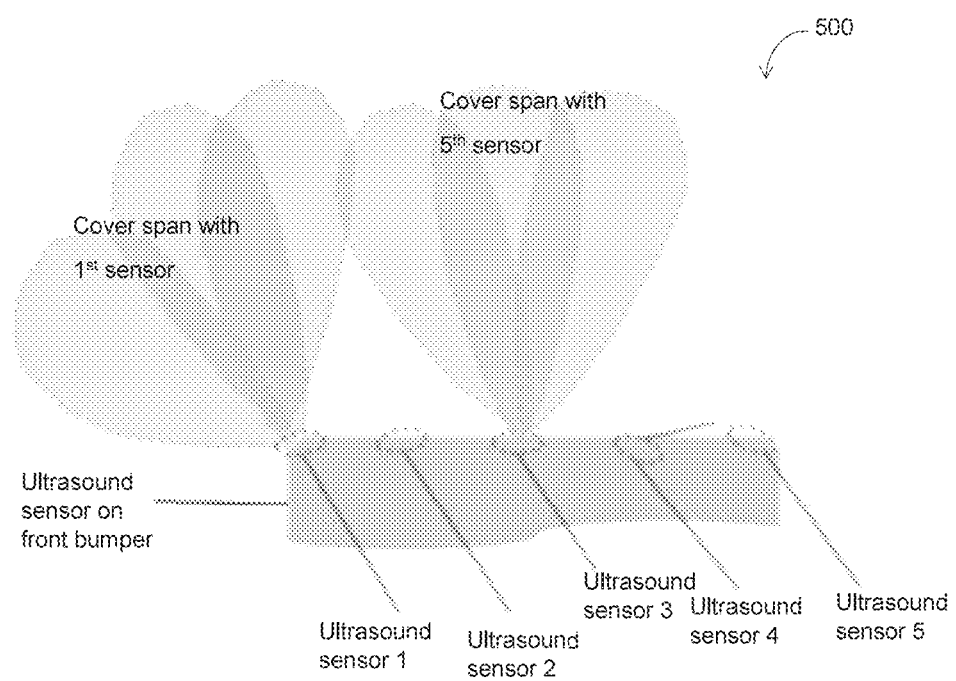

FIGS. 5A-5C collectively illustrate dynamic coverage of ultrasound sensors with use of rotatable fixture arrangement, in accordance with an embodiment. FIGS. 5A-5C are explained in conjunction with elements from FIG. 1 to FIG. 4.

With reference to FIG. 5A, there is shown in 500A, a side view of an ultrasound sensor 108 and a rotatable fixture arrangement 502 on which the ultrasound sensor 108 is mounted. Further, there is shown a top view of the ultrasound sensor 504 at a first rotational angle and a top view of the ultrasound sensor 506 at a second rotational angle. The ultrasound sensor 108, 504 and 506 may correspond to a single ultrasound sensor. The RUCAM 316 may be configured to extend coverage direction of each the ultrasound sensors 108, 504, and 506.

With reference to FIG. 5B, there is shown in 500B, a top view of the ultrasound sensor 108 for ultrasound lobe depiction with large coverage area (area represented with dotted line). There is shown an initial direction of an ultrasound lobe 508 and a changed direction of an ultrasound lobe 510 with a 60-degree orientation coverage of the ultrasound sensor 108.

With reference to FIG. 5C, there is shown in 500C, five ultrasound sensors (labelled as ultrasound sensor 1 to ultrasound sensor 5) configured on a vehicular frame associated with the vehicle 114. In accordance with an embodiment, each of the ultrasound sensor 1 to ultrasound sensor 5 may have a coverage of 60 degree. The vehicle guiding system 102 may be configured to measure distance of the object 118 of the full front region with possible overlapping as shown in the FIG. 5C.

Figure 6A:
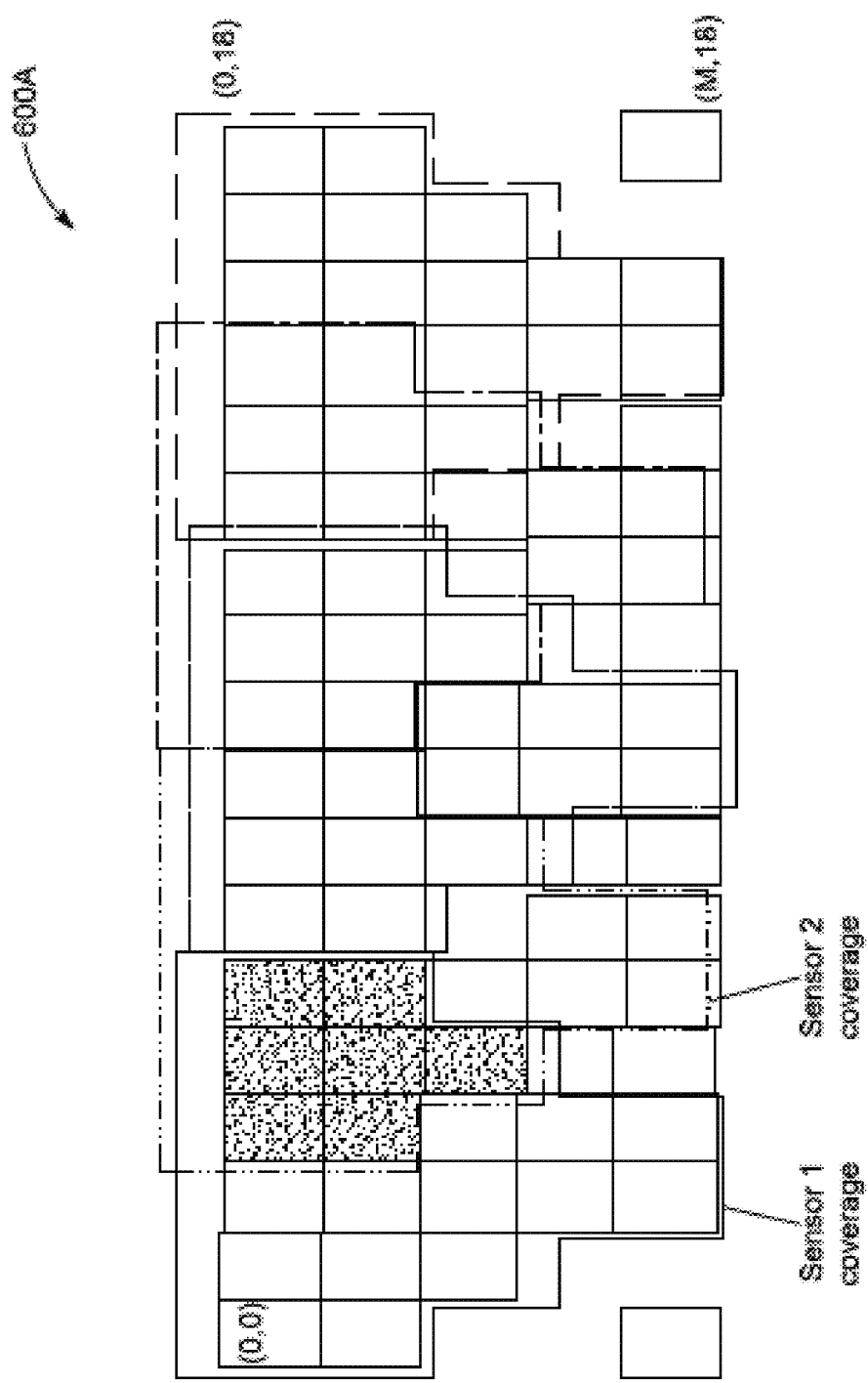
Figure 6C:
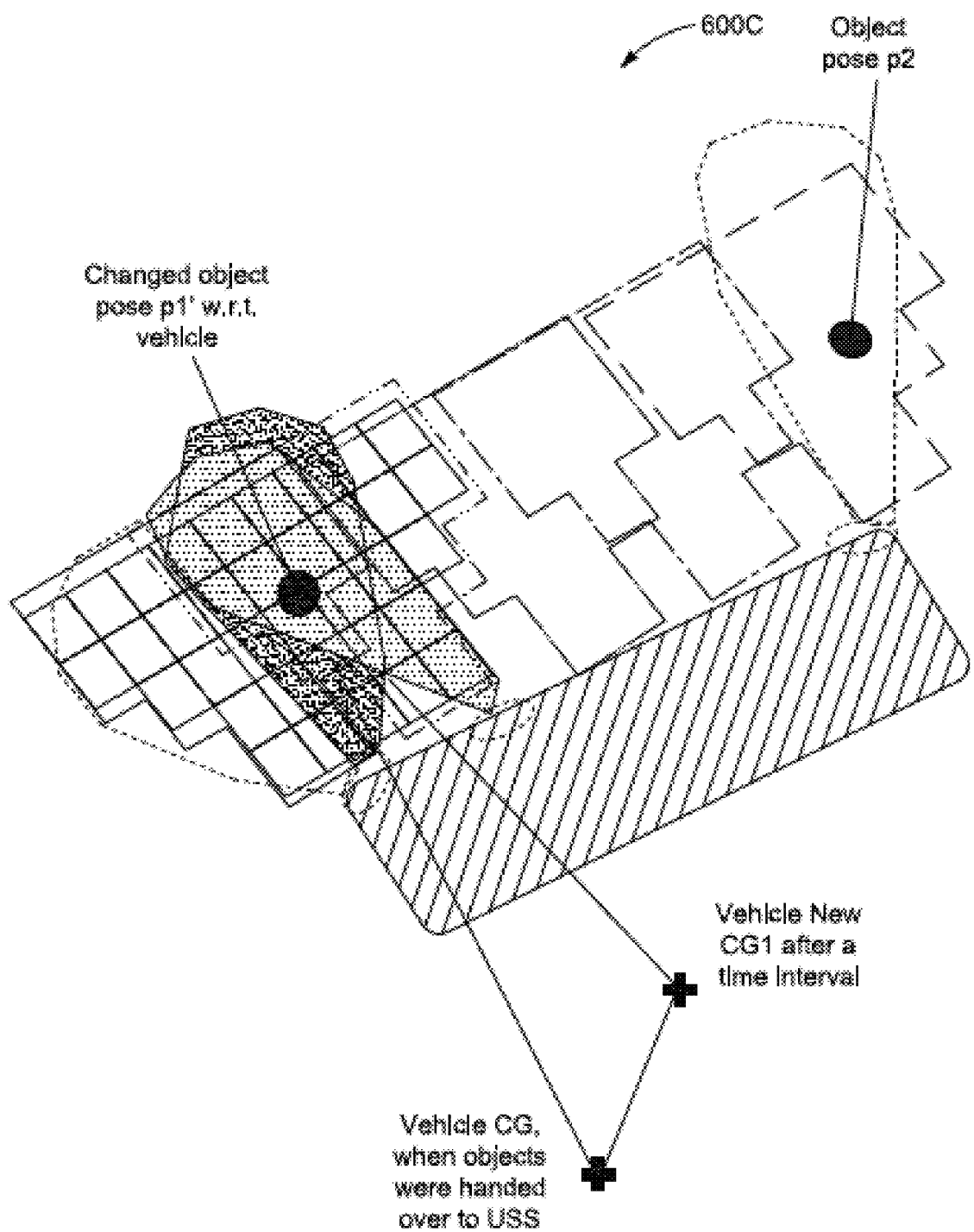

FIGS. 6A-6C illustrate schematic diagrams for assigning at least one ultrasound sensor from a plurality of ultrasound sensors (for example, the ultrasound sensors 108) in an area divided into grids, in accordance with an embodiment. FIGS. 6A-6C are explained in conjunction with elements from FIG. 1 to FIG. 5C.

With reference to FIG. 6A, there is shown in 600A, an area that is divided into a 10 cm by 10 cm grid. The area is numbered from (0,0) as top left cell to (0,18) as top right cell. (M, 18) is the bottom right cell. M can vary based on range of the ultrasound sensors 108. In accordance with an embodiment, a dimension of each cell may vary based on dimensions of the vehicle 114 and distribution of the ultrasound sensors 108. Total horizontal area may be divided into 5 that may be primarily under the control of the five ultrasound sensors from the ultrasound sensors 108.

The vehicle guiding system 102 may be configured to determine at least one second position of the object 118 relative to the vehicle 114, when at least one first position of the object 118 is in non-conformance with one or more object position criteria. The at least one first position of the object 118 may be determined by the vehicle guiding system 102 using high range sensors 106 when the object 118 is beyond the blind spot region 116. The at least one second position of the object 118 may be determined by the vehicle guiding system 102 using ultrasound sensors 108 when the object 118 comes in the blind spot region 116.

The vehicle guiding system 102 may be configured to determine for each of the at least one first position of the object non-conformance with one or more object position criteria. Each of the one or more object position criteria may correspond to at least one of: position of the object 118 relative to the vehicle 114 and visibility of the object 118 to the at least one high range sensor 106. In accordance with an embodiment, the one or more object position criteria may comprise a distance between the vehicle 114 and the object 118 being below a predefined distance. The assignment of the at least one ultrasound sensor 108 may be based on the distance between the vehicle 114 and the object 118.

Assigning appropriate one or more ultrasound sensor from the ultrasound sensors 108 to individual objects (such as the object 118) to be tracked may need some analysis of the area to be covered by the ultrasound sensor and generate mapping profile at any moment of time.

In accordance with an embodiment, assigning one or more ultrasound sensor from the ultrasound sensors 108 by the vehicle guiding system 102 may include dividing the area covered by the plurality of ultrasound sensors into a plurality of grids. In accordance with an embodiment, dimensions of each of the plurality of grids may correspond to at least one of: the number of the plurality of ultrasound sensors, distribution of the ultrasound sensors 108 on the vehicle 114, and vehicle dimensions.

In accordance with an embodiment, the vehicle guiding system 102 may be configured to divide the area into a plurality of sub-sections based on the number of the ultrasound sensors 108. Each of the plurality of sub-sections may be associated with one of the ultrasound sensors 108. Each of the plurality of sub-sections may include a subset of grids from the plurality of grids. In accordance with an embodiment, the vehicle guiding system 102 may be configured to identify at least one overlapping region between the plurality of sub-sections. Each of the at least one overlapping region may include a common subset of grids between two adjacent sub-sections in the plurality of sub-sections.

With reference to FIG. 6A, coverage area for each of the ultrasound sensors 108 may be a specific number of grid cells grouped in a specific dimension and a cell boundary is drawn considering the area covered by rotating a particular ultrasound sensor. There are shown in FIG. 6A, overlapping regions covered under two adjacent ultrasound sensors.

With Reference to FIG. 6B, the OUAM 314 may be configured to assign, at a first time instance (T), at least one first ultrasound sensor from the ultrasound sensors 108 to the object 118 based on at least one of: availability of the object in one of the at least one overlapping region, availability of the object in one of at least one non-overlapping region, the current position of the vehicle 114 at the first time instance, and the current assignment of each of the ultrasound sensors 108.

In accordance with an exemplary embodiment, the object covered over non overlapping region may be assigned to two consecutive ultrasound sensors, after finding a correct orientation. In accordance with an embodiment, the object covered over overlapped regions may need to determine whether any of the corresponding ultrasound sensors is already assigned to another object. Then, a free ultrasound sensor may be assigned for tracking the object. In accordance with an embodiment, when two ultrasound sensors are free, that is, not assigned to any object, then the two ultrasound sensors may jointly cover the object.

With Reference to FIGS. 6B and 6C, there is shown that the same ultrasound sensor (USS1) may be assigned to the same object 1 by just rotating the ultrasound sensor (USS1) at T+n time instant (FIG. 6C) from its direction at T time instant (FIG. 6B).

Similarly, in FIG. 6C, a second ultrasound sensor (USS3) may be pointing to the same object 1 at T+n time instant as the ultrasound sensor (USS3) doesn't have any other things in proximity to monitor. In accordance with an embodiment, in FIG. 6B, the object 2 was first monitored by the ultrasound sensor (USS2) and ultrasound sensor (USS4) jointly at a time instant T. In accordance with an embodiment, the object 2 may be monitored only by the ultrasound sensor (USS2) at time instant T+n as the position of the object 2 may be beyond the coverage of ultrasound sensor (USS4).

In accordance with an embodiment, the OUAM 314 may be configured to reassign, at a second time instance (T+n), at least one second ultrasound sensor from the ultrasound sensors 108 to the object based on at least one of: availability of the object in one of the at least one overlapping region, availability of the object in one of at least one non-overlapping region, the current position of the vehicle at the second time instance, and the current assignment of each of the plurality of ultrasound sensors. In accordance with an embodiment, reassigning the at least one second ultrasound sensor may include rotating at least one of the at least one second ultrasound sensor on the associated rotatable mount to detect the object.

Figure 7:
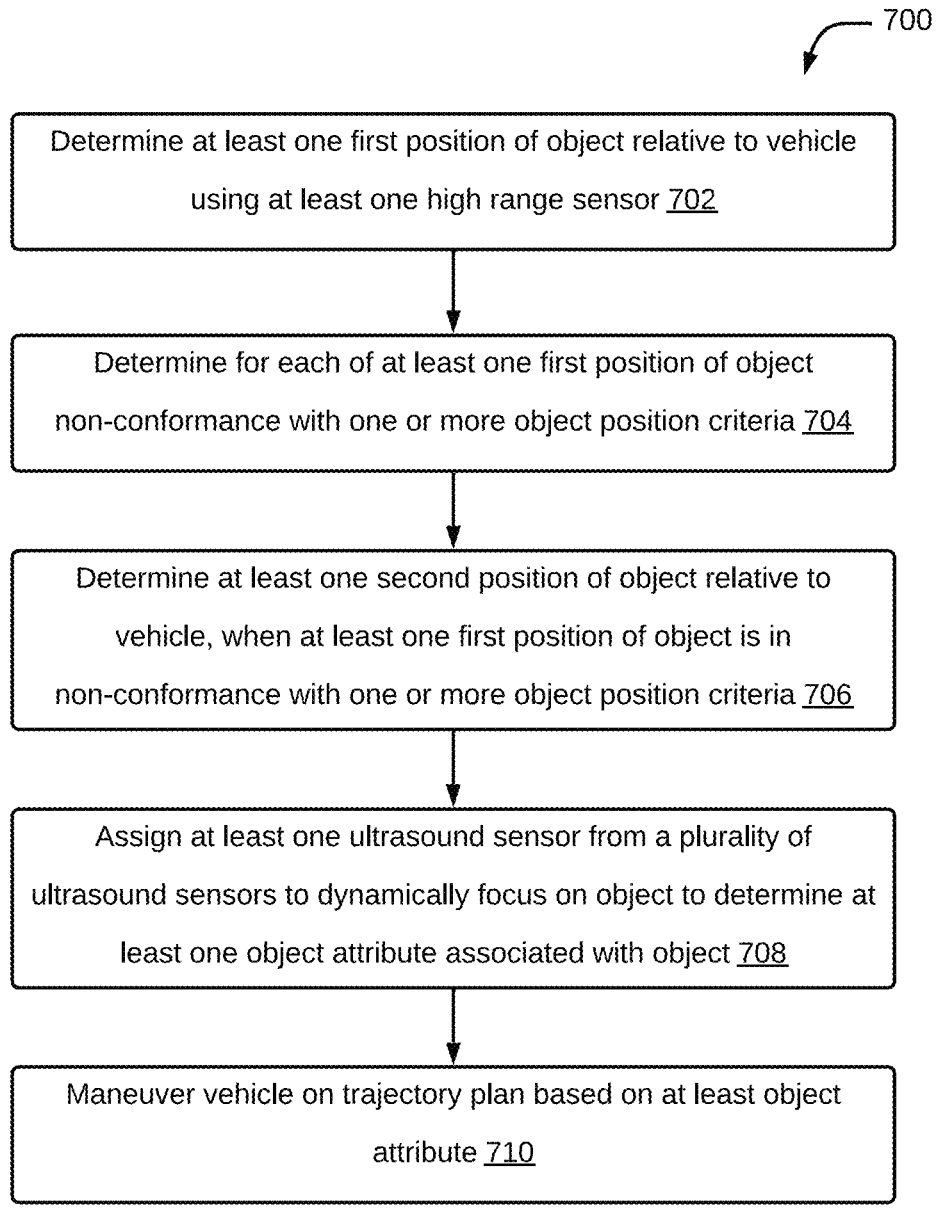
FIG. 7 is a flowchart that illustrates an exemplary method for maneuvering vehicles using adjustable ultrasound sensors, in accordance with an embodiment.

FIG. 7 is a flowchart that illustrates an exemplary method for maneuvering vehicles using adjustable ultrasound sensors, in accordance with an embodiment of the present disclosure. FIG. 7 is explained in conjunction with FIG. 1 to FIG. 6C. With reference to FIG. 7, there is shown a flowchart 700. The operations of the exemplary method may be executed by any computing system, for example, by the vehicle guiding system 102 of FIG. 1. The operations of the flowchart 700 may start at 702 and proceed to 704.

At 702, at least one first position of an object 118 may be determined relative to a vehicle 114 using at least one high range sensor 106. In accordance with an embodiment, the SODCTM 312 of the vehicle guiding system 102 may be configured to determine at least one first position of an object 118 relative to a vehicle 114 using at least one high range sensor 106.

At 704, determining for each of the at least one first position of the object 118 non-conformance with one or more object position criteria. In accordance with an embodiment, the SODCTM 312 may be configured to determine for each of the at least one first position of the object non-conformance with one or more object position criteria.

The one or more object position criteria may correspond to position of the object 118 relative to the vehicle 114. In this case, the one or more object position criteria may comprise a distance between the vehicle 114 and the object 118 being below a predefined distance. In accordance with an embodiment, assignment of the at least one ultrasound sensor may be based on the distance between the vehicle 114 and the object 118. The one or more object position criteria may correspond to visibility of the object 118 to the at least one high range sensor 106. In this case, the one or more object position criteria may include visibility of the object 118 to the at least one high range sensor 106 being above a predefined visibility threshold.

At 706, at least one second position of the object 118 may be determined relative to the vehicle 114, when the at least one first position of the object 118 is in non-conformance with the one or more object position criteria. In accordance with an embodiment, the SODCTM 312 may be configured to determine at least one second position of the object 118 relative to the vehicle 114, when the at least one first position of the object is in non-conformance with the one or more object position criteria.

At 708, at least one ultrasound sensor from a plurality of ultrasound sensors may be assigned to dynamically focus on the object 118 to determine at least one object attribute associated with the object 118. The RUCAM 316 may be configured to assign the at least one ultrasound sensor from a plurality of ultrasound sensors 108 to dynamically focus on the object 118 to determine at least one object attribute associated with the object 118.

In accordance with an embodiment, each of the plurality of ultrasound sensors 108 may be deployed on a rotatable mount. The assigned at least one ultrasound sensor may be dynamically focused by rotating on the associated rotatable mount.

In accordance with an embodiment, deploying each of the plurality of ultrasound sensors on the associated rotatable mount and dynamically focusing at least one ultrasound sensor by rotating on the associated rotatable mount using the RUCAM 316 may increase the effectiveness of FOV of the plurality of ultrasound sensors.

At 710, the vehicle 114 may be maneuvered on a trajectory plan based on the at least one object attribute. In accordance with an embodiment, the TPVDM 308 may be configured to maneuver the vehicle 114 on a trajectory plan based on the at least object attribute. In accordance with an embodiment, maneuvering the vehicle 114 may comprise generating one or more maneuvering trajectory routes.

Figure 8:
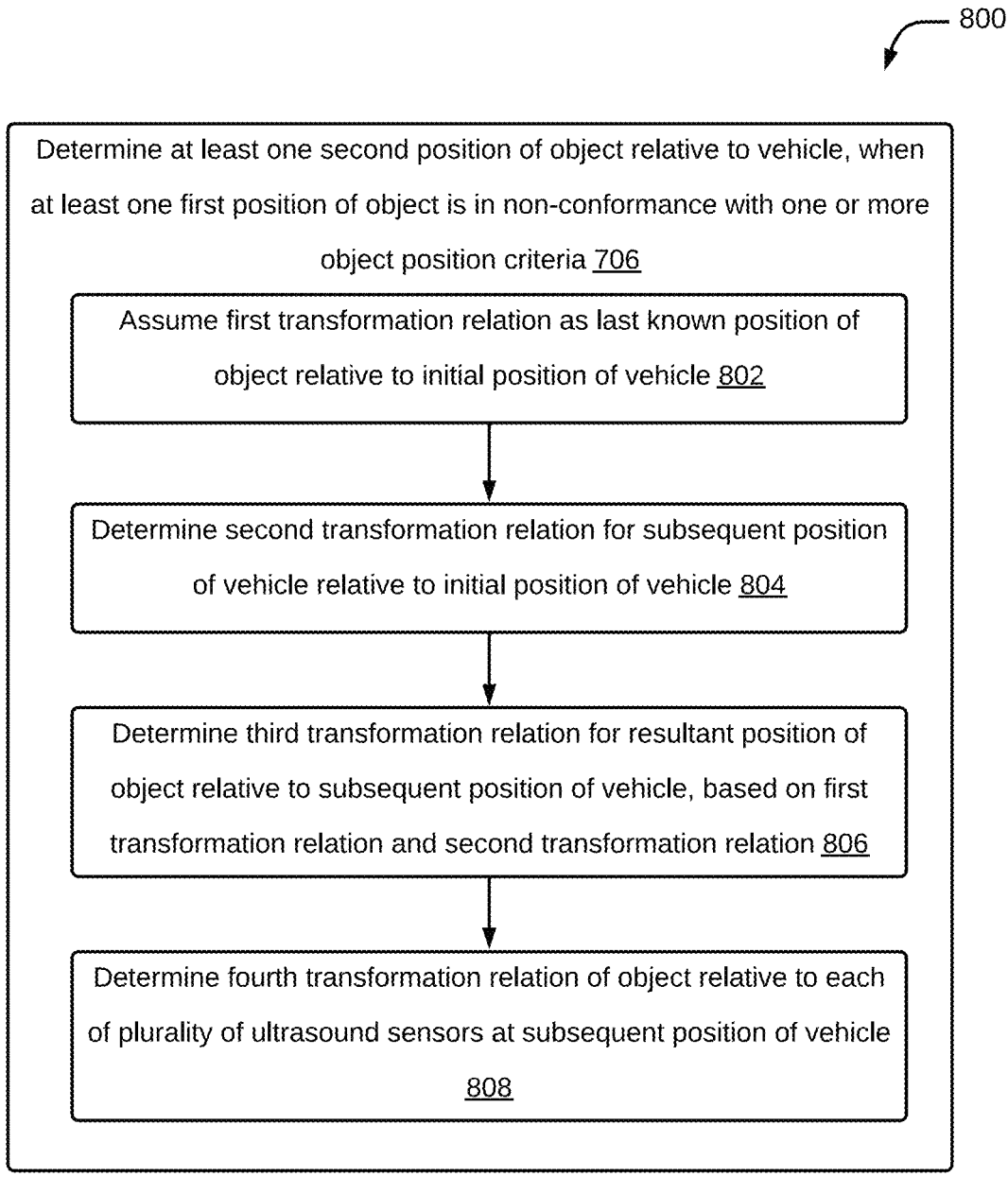
FIG. 8 is a flowchart that illustrates an exemplary method for determining at least one second position of an object relative to a vehicle, in accordance with an embodiment.

FIG. 8 is a flowchart that illustrates an exemplary method for determining the at least one second position of the object relative to the vehicle, in accordance with an embodiment of the disclosure. FIG. 8 is explained in conjunction with FIG. 1 to FIG. 7.

With reference to FIG. 8, there is shown a flowchart 800. The operations of the exemplary method may be executed by any computing system, for example, by the vehicle guiding system 102 of FIG. 1. The operations of the flowchart 800 may start at 802 and proceed to 804.

At 802, a first transformation relation may be assumed as a last known position of the object 118 relative to an initial position of the vehicle 114. In accordance with an embodiment, the SODCTM 312 may be configured to assume the first transformation relation as the last known position of the object 118 relative to the initial position of the vehicle 114.

At 804, a second transformation relation may be determined for a subsequent position of the vehicle 114 relative to the initial position of the vehicle 114. In accordance with an embodiment, the SODCTM 312 may be configured to determine a second transformation relation for a subsequent position of the vehicle 114 relative to the initial position of the vehicle 114.

At 806, a third transformation relation may be determined for the resultant position of the object 118 relative to the subsequent position of the vehicle 114, based on the first transformation relation and the second transformation relation. In accordance with an embodiment, the SODCTM 312 may be configured to determine the third transformation relation for the resultant position of the object 118 relative to the subsequent position of the vehicle 114, based on the first transformation relation and the second transformation relation. The non-conformance with one or more object position criteria may be determined for the subsequent position.

At 808, a fourth transformation relation of the object 118 may be determined relative to each of the plurality of ultrasound sensors at the subsequent position of vehicle 114. In accordance with an embodiment, the SODCTM 312 may be configured to determine the fourth transformation relation of the object 118 relative to each of the plurality of ultrasound sensors at the subsequent position of vehicle 114. In accordance with an embodiment, the at least one ultrasound sensor may be assigned based on the determined fourth transformation relation of the object 118.

Figure 9:
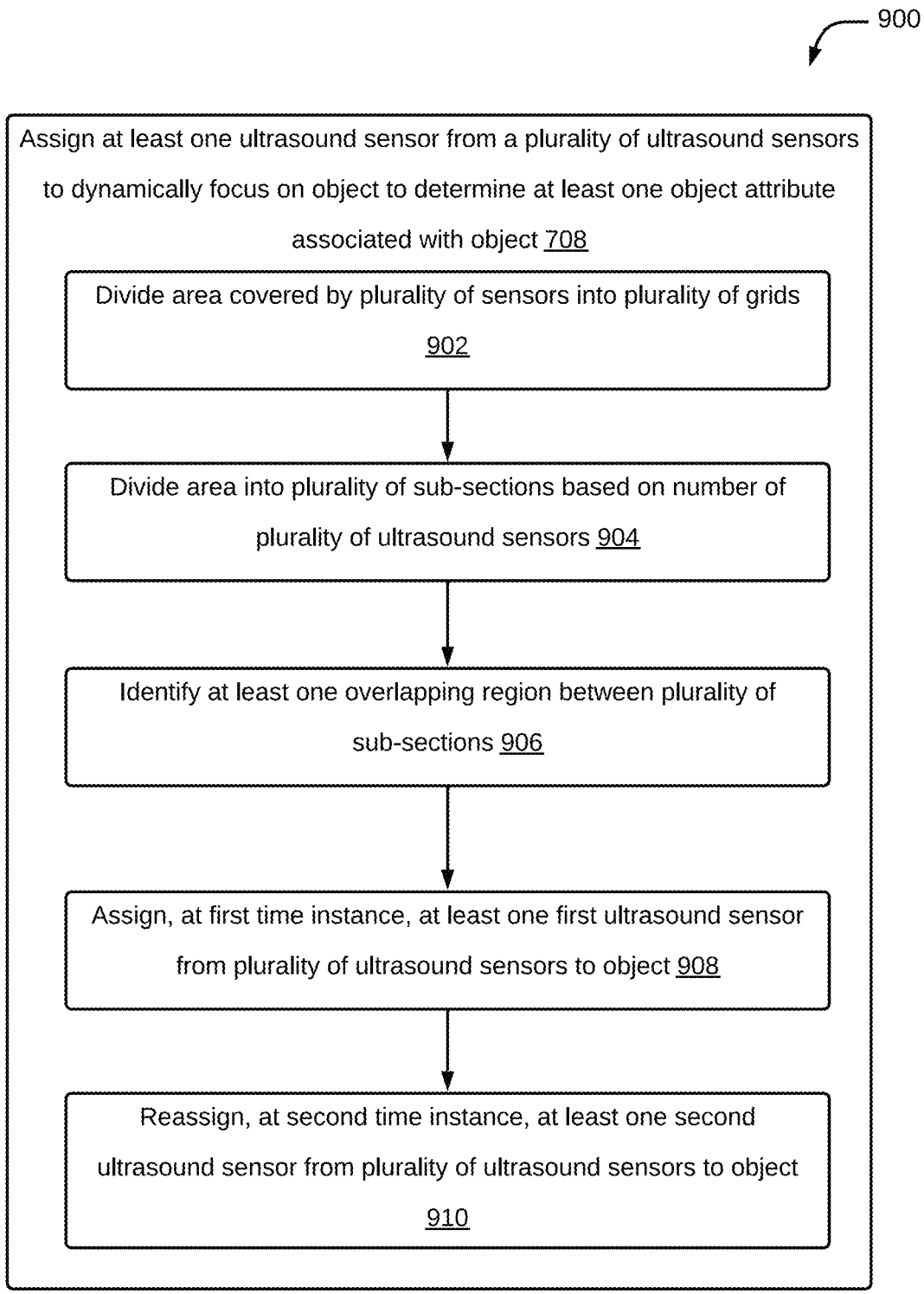
FIG. 9 is a flowchart that illustrates an exemplary method for assigning the at least one ultrasound sensor from the plurality of ultrasound sensors to dynamically focus on an object to determine at least one object attribute associated with the object, in accordance with an embodiment.

FIG. 9 is a flowchart that illustrates an exemplary method for assigning the at least one ultrasound sensor from the plurality of ultrasound sensors 108 to dynamically focus on an object 118 to determine at least one object attribute associated with the object 118, in accordance with an embodiment of the disclosure. FIG. 9 is explained in conjunction with FIG. 1 to FIG. 8.

With reference to FIG. 9, there is shown a flowchart 900. The operations of the exemplary method may be executed by any computing system, for example, by the vehicle guiding system 102 of FIG. 1. The operations of the flowchart 900 may start at 902 and proceed to 904.

At 902, an area covered by the plurality of ultrasound sensors may be divided into a plurality of grids. In accordance with an embodiment, the OUAM 314 may be configured to divide an area covered by the plurality of ultrasound sensors into a plurality of grids. In accordance with an embodiment, dimensions of each of the plurality of grids may correspond to at least one of: the number of the plurality of ultrasound sensors, distribution of the plurality of sensors on the vehicle, and the vehicle dimensions.

At 904, the area may be divided into a plurality of sub-sections based on the number of plurality of ultrasound sensors. In accordance with an embodiment, the OUAM 314 may be configured to divide the area into a plurality of sub-sections based on the number of plurality of ultrasound sensors 108. In accordance with an embodiment, each of the plurality of sub-sections is associated with one of the plurality of ultrasound sensors 108. In accordance with an embodiment, each of the plurality of sub-sections may comprise a subset of grids from the plurality of grids.

At 906, at least one overlapping region may be identified between the plurality of sub-sections. In accordance with an embodiment, the OUAM 314 may be configured to identify at least one overlapping region between the plurality of sub-sections. In accordance with an embodiment, each of the at least one overlapping region may comprise a common subset of grids between two adjacent sub-sections in the plurality of sub-sections.

At 908, at a first-time instance, at least one first ultrasound sensor from the plurality of ultrasound sensors 108 may be assigned to the object 118 based on at least one of: availability of the object in one of the at least one overlapping region, availability of the object in one of at least one non-overlapping region, the current position of the vehicle at the first-time instance, and the current assignment of each of the plurality of ultrasound sensors.

At 910, at a second time instance, at least one second ultrasound sensor from the plurality of ultrasound sensors may be reassigned to the object. In accordance with an embodiment, the OUAM 314 may be configured to reassign, at a second time instance, at least one second ultrasound sensor from the plurality of ultrasound sensors 108 to the object 118 based on at least one of: availability of the object in one of the at least one overlapping region, availability of the object in one of at least one non-overlapping region, the current position of the vehicle at the second time instance, and the current assignment of each of the plurality of ultrasound sensors.

In accordance with an embodiment, reassigning the at least one second ultrasound sensor may include rotating at least one of the at least one second ultrasound sensor on the associated rotatable mount to detect the object 118.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It will be appreciated that, for clarity purposes, the above description has described embodiments of the disclosure with reference to different functional units and processors. However, it will be apparent that any suitable distribution of functionality between different functional units, processors or domains may be used without detracting from the disclosure. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present disclosure has been described in connection with some embodiments, it is not intended to be limited to the specific form set forth herein. Rather, the scope of the present disclosure is limited only by the claims. Additionally, although a feature may appear to be described in connection with particular embodiments, one skilled in the art would recognize that various features of the described embodiments may be combined in accordance with the disclosure.

The present disclosure facilitates maneuvering of vehicles using adjustable ultrasound sensors. The disclosed system may assign ultrasound sensor(s) to dynamically focus on an object located in a blind spot. The blind spot may correspond to an area that obscures vision of a vehicle. In accordance with an embodiment, the assigned ultrasound sensor(s) may be deployed on a rotatable mount to increase FOV of the assigned ultrasound sensor(s). Exemplary aspects of the disclosure may be used for closer object detection, when the vehicle moves in a constrained space. In an embodiment, the vehicle guiding system may be configured to assist in providing navigational suggestions to a user of the vehicle or the vehicle itself to avoid mishaps. The disclosed method and system may provide steps and actions associated with navigation of vehicles in an automated way. Therefore, embodiments of the disclosed system may result in solving a problem deeply rooted in navigation technology, autonomous vehicles, and vehicular safety.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for maneuvering an autonomous vehicle using adjustable ultrasound sensors, the method comprising:
   determining, by a vehicle guiding device, at least one first position of an object relative to the autonomous vehicle using at least one high range sensor;
   determining for each of the at least one first position of the object, by the vehicle guiding device, non-conformance with one or more object position criteria, wherein each of the one or more object position criteria corresponds to at least one of: position of the object relative to the autonomous vehicle and visibility of the object to the at least one high range sensor;
   determining, by the vehicle guiding device, at least one second position of the object relative to the autonomous vehicle using at least one ultrasound sensor from a plurality of ultrasound sensors, when the at least one first position of the object is in non-conformance with the one or more object position criteria;
   assigning in response to the determination of at least one second position, by the vehicle guiding device, at least one ultrasound sensor from the plurality of ultrasound sensors to dynamically focus on the object to determine at least one object attribute associated with the object, wherein each of the plurality of ultrasound sensors is deployed on a rotatable mount, and wherein the assigned at least one ultrasound sensor is dynamically focused by rotating on the associated rotatable mount, and
   wherein assigning the at least one ultrasound sensor from the plurality of ultrasound sensors comprises:
      dividing an area covered by the plurality of ultrasound sensors into a plurality of grids,
         wherein coverage area for each of the ultrasound sensors is indicated as a specific number of grid cells grouped in a specific dimension and a cell boundary is drawn considering the area covered by rotating a particular ultrasound sensor,
         wherein dimensions of each of the plurality of grids correspond to the number of the plurality of ultrasound sensors, distribution of the plurality of ultrasound sensors on the autonomous vehicle, and vehicle dimensions;
      identifying at least one overlapping region covered under two adjacent ultrasound sensors, wherein the at least one overlapping region comprises a common subset of grids associated with the two adjacent ultrasound sensors,
      assigning, at a first time instance, at least one first ultrasound sensor from the plurality of ultrasound sensors to the object based on at least one of: availability of the object in one of the at least one overlapping region, availability of the object in one of at least one non-overlapping region, the current position of the autonomous vehicle at the first time instance, and a current assignment of each of the plurality of ultrasound sensors; and
   maneuvering, by the vehicle guiding device, the autonomous vehicle on a trajectory plan based on the at least one object attribute.

2. The method of claim 1, wherein the one or more object position criteria comprises a distance between the autonomous vehicle and the object being below a predefined distance, and wherein assignment of the at least one ultrasound sensor is based on the distance between the autonomous vehicle and the object.

3. The method of claim 1, wherein the one or more object position criteria comprises visibility of the object to the at least one high range sensor being above a predefined visibility threshold.

4. The method of claim 1, wherein deploying each of the plurality of ultrasound sensors on the associated rotatable mount and dynamically focusing the at least one ultrasound sensor by rotating on the associated rotatable mount increases the effectiveness of Field Of View (FOV) of the plurality of ultrasound sensors.

5. The method of claim 1, further comprising determining a fourth transformation relation of the object relative to each of the plurality of ultrasound sensors at the subsequent position of the autonomous vehicle, wherein the at least one ultrasound sensor is assigned based on the determined fourth transformation relation of the object.

6. The method of claim 5, wherein assigning the at least one ultrasound sensor from the plurality of ultrasound sensors further comprises:
   dividing the area into a plurality of sub-sections based on the number of plurality of ultrasound sensors, wherein each of the plurality of sub-sections is associated with one of the plurality of ultrasound sensors, and wherein each of the plurality of sub-sections comprises a subset of grids from the plurality of grids;
   identifying the at least one overlapping region between the plurality of sub-sections, wherein each of the at least one overlapping region comprises a common subset of grids between two adjacent sub-sections in the plurality of sub-sections; and
   assigning, at the first time instance, at least one first ultrasound sensor from the plurality of ultrasound sensors to the object based on at least one of: the availability of the object in one of the at least one overlapping region, the availability of the object in one of at least one non-overlapping region, the current position of the autonomous vehicle at the first time instance, and the current assignment of each of the plurality of ultrasound sensors.

7. The method of claim 6, further comprising reassigning, at a second time instance, at least one second ultrasound sensor from the plurality of ultrasound sensors to the object based on at least one of: availability of the object in one of the at least one overlapping region, availability of the object in one of at least one non-overlapping region, the current position of the autonomous vehicle at the second time instance, and the current assignment of each of the plurality of ultrasound sensors.

8. The method of claim 7, wherein reassigning the at least one second ultrasound sensor comprises rotating the at least one second ultrasound sensor on the associated rotatable mount to detect the object.

9. The method of claim 1, wherein maneuvering the autonomous vehicle comprises generating one or more maneuvering trajectory routes.

10. A system for maneuvering an autonomous vehicle using adjustable ultrasound sensors, the system comprising:
   a processor; and
   a memory communicatively coupled to the processor, wherein the memory is configured to store processor-executable instructions, wherein the processor-executable instructions, on execution, cause the processor to:
determine at least one first position of an object relative to the autonomous vehicle using at least one high range sensor;
determine for each of the at least one first position of the object non-conformance with one or more object position criteria, wherein each of the one or more object position criteria corresponds to at least one of: position of the object relative to the autonomous vehicle and visibility of the object to the at least one high range sensor;
determine at least one second position of the object relative to the autonomous vehicle using at least one ultrasound sensor from a plurality of ultrasound sensors, when the at least one first position of the object is in non-conformance with the one or more object position criteria;
assign in response to the determination of at least one second position, at least one ultrasound sensor from the plurality of ultrasound sensors to dynamically focus on the object to determine at least one object attribute associated with the object,
wherein each of the plurality of ultrasound sensors is deployed on a rotatable mount, and wherein the assigned at least one ultrasound sensor is dynamically focused by rotating on the associated rotatable mount; and
wherein assigning the at least one ultrasound sensor from the plurality of ultrasound sensors comprises:
dividing an area covered by the plurality of ultrasound sensors into a plurality of grids,
wherein coverage area for each of the ultrasound sensors is indicated as a specific number of grid cells grouped in a specific dimension and a cell boundary is drawn considering the area covered by rotating a particular ultrasound sensor,
wherein dimensions of each of the plurality of grids correspond to the number of the plurality of ultrasound sensors, distribution of the plurality of ultrasound sensors on the autonomous vehicle, and vehicle dimensions;
identifying at least one overlapping region covered under two adjacent ultrasound sensors, wherein the at least one overlapping region comprises a common subset of grids associated with the two adjacent ultrasound sensors,
assigning, at a first time instance, at least one first ultrasound sensor from the plurality of ultrasound sensors to the object based on at least one of: availability of the object in one of the at least one overlapping region, availability of the object in one of at least one non-overlapping region, the current position of the autonomous vehicle at the first time instance, and a current assignment of each of the plurality of ultrasound sensors; and
maneuver the autonomous vehicle on a trajectory plan based on the at least one object attribute.

11. The system of claim 10, wherein the one or more object position criteria comprises a distance between the autonomous vehicle and the object being below a predefined distance, and wherein assignment of the at least one ultrasound sensor is based on the distance between the autonomous vehicle and the object.

12. The system of claim 10, wherein the one or more object position criteria comprises visibility of the object to the at least one high range sensor being above a predefined visibility threshold.

13. The system of claim 10, wherein deploying each of the plurality of ultrasound sensors on the associated rotatable mount and dynamically focusing the at least one ultrasound sensor by rotating on the associated rotatable mount increases the effectiveness of Field Of View (FOV) of the plurality of ultrasound sensors.

14. The system of claim 10, wherein to assign the at least one ultrasound sensor from the plurality of ultrasound sensors, the processor-executable instructions further cause the processor to:
divide the area into a plurality of sub-sections based on the number of plurality of ultrasound sensors, wherein each of the plurality of sub-sections is associated with one of the plurality of ultrasound sensors, and wherein each of the plurality of sub-sections comprises a subset of grids from the plurality of grids;
identify the at least one overlapping region between the plurality of sub-sections, wherein each of the at least one overlapping region comprises a common subset of grids between two adjacent sub-sections in the plurality of sub-sections; and
assign, at the first time instance, at least one first ultrasound sensor from the plurality of ultrasound sensors to the object based on at least one of: the availability of the object in one of the at least one overlapping region, the availability of the object in one of at least one non-overlapping region, the current position of the autonomous vehicle at the first time instance, and the current assignment of each of the plurality of ultrasound sensors.

15. The system of claim 14, wherein the processor-executable instructions further cause the processor to reassign, at a second time instance, at least one second ultrasound sensor from the plurality of ultrasound sensors to the object based on at least one of: availability of the object in one of the at least one overlapping region, availability of the object in one of at least one non-overlapping region, the current position of the autonomous vehicle at the second time instance, and the current assignment of each of the plurality of ultrasound sensors.

16. The system of claim 15, wherein to reassign the at least one second ultrasound sensor, the processor-executable instructions cause the processor to rotate at least one second ultrasound sensor on the associated rotatable mount to detect the object.

17. The system of claim 10, wherein to maneuver the autonomous vehicle, the processor-executable instructions cause the processor to generate one or more maneuvering trajectory routes.

18. A non-transitory computer-readable medium storing computer-executable instructions for maneuvering an autonomous vehicle using adjustable ultrasound sensors, the computer-executable instructions when processed by at least one processor causes the at least one processor to perform operations comprising:
determining at least one first position of an object relative to the autonomous vehicle using at least one high range sensor;
determining for each of the at least one first position of the object non-conformance with one or more object position criteria, wherein each of the one or more object position criteria corresponds to at least one of: position of the object relative to the autonomous vehicle and visibility of the object to the at least one high range sensor;

determining at least one second position of the object relative to the autonomous vehicle using at least one ultrasound sensor from a plurality of ultrasound sensors, when the at least one first position of the object is in non-conformance with the one or more object position criteria;

assigning in response to the determination of at least one second position, at least one ultrasound sensor from the plurality of ultrasound sensors to dynamically focus on the object to determine at least one object attribute associated with the object, wherein each of the plurality of ultrasound sensors is deployed on a rotatable mount, and wherein the assigned at least one ultrasound sensor is dynamically focused by rotating on the associated rotatable mount; and wherein assigning the at least one ultrasound sensor from the plurality of ultrasound sensors comprises:

dividing an area covered by the plurality of ultrasound sensors into a plurality of grids, wherein coverage area for each of the ultrasound sensors is indicated as a specific number of grid cells grouped in a specific dimension and a cell boundary is drawn considering the area covered by rotating a particular ultrasound sensor, and wherein dimensions of each of the plurality of grids correspond to the number of the plurality of ultrasound sensors, distribution of the plurality of ultrasound sensors on the autonomous vehicle, and vehicle dimensions;

identifying at least one overlapping region covered under two adjacent ultrasound sensors, wherein the at least one overlapping region comprises a common subset of grids associated with the two adjacent ultrasound sensors, assigning, at a first time instance, at least one first ultrasound sensor from the plurality of ultrasound sensors to the object based on at least one of: availability of the object in one of the at least one overlapping region, availability of the object in one of at least one non-overlapping region, the current position of the autonomous vehicle at the first time instance, and a current assignment of each of the plurality of ultrasound sensors; and maneuvering the autonomous vehicle on a trajectory plan based on the at least one object attribute.

\* \* \* \* \*